United States Patent [19]

Fujita et al.

[11] Patent Number: 5,153,283

[45] Date of Patent: Oct. 6, 1992

[54] PROCESS FOR PRODUCING VINYL POLYMER OR VINYLIDENE POLYMER

[75] Inventors: Takanori Fujita, Niihama; Masashi Mori, Kagawa, both of Japan

[73] Assignee: Sumitomo Chemical Co., Ltd., Osaka, Japan

[21] Appl. No.: 680,999

[22] Filed: Apr. 5, 1991

[30] Foreign Application Priority Data

Apr. 27, 1990 [JP] Japan ................................. 2-112422

[51] Int. Cl.$^5$ ............................................... C08F 4/50
[52] U.S. Cl. ................... 526/144; 526/145; 526/147; 526/197
[58] Field of Search ............... 526/144, 145, 147, 193

[56] References Cited

U.S. PATENT DOCUMENTS

| | | | |
|---|---|---|---|
| 3,262,803 | 7/1966 | Buder et al. | |
| 3,377,330 | 4/1968 | Mortimer et al. | 526/193 |
| 4,296,214 | 10/1981 | Kamada et al. | 525/2 |
| 4,717,756 | 1/1988 | Kato et al. | 526/146 |
| 4,837,286 | 6/1989 | Kato et al. | 526/217 |
| 4,859,750 | 8/1989 | Kato et al. | 526/135 |

FOREIGN PATENT DOCUMENTS 0019097  11/1980  European Pat. Off.
52-7463  3/1977  Japan .

OTHER PUBLICATIONS

Chemical Abstracts, vol. 86, No. 14, Apr., 4, 1977, Saito et al., "Chain-transfer agents in polymerization of styrene", p. 47 Chem. Abstr. 86:90851f (1977).

*Primary Examiner*—Joseph L. Schofer
*Assistant Examiner*—M. Nagumo
*Attorney, Agent, or Firm*—Birch, Stewart, Kolasch & Birch

[57] ABSTRACT

An improved process for producing a vinyl or vinylidene polymer comprising polymerizing a monomer having a vinyl or vinylidene group in the presence of
(a) a radical polymerization initiator,
(b) an organic phosphorous compound of the formula:

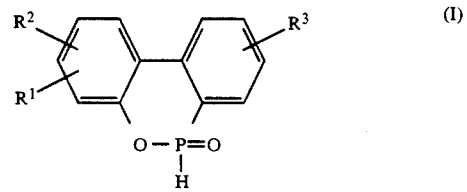

wherein $R^1$, $R^2$ and $R^3$ are independently hydrogen atom, chlorine atom, bromine atom, an alkyl, an aralkyl, or an aryl,
(c) an amine hydrohalide or a quaternary ammonium halide, and
(d) a copper-containing compound, which can be carried out rapidly and can give the vinyl or vinylidene polymer having excellent mechanical strength without coloring.

16 Claims, No Drawings

PROCESS FOR PRODUCING VINYL POLYMER OR VINYLIDENE POLYMER

This invention relates to an improved process for producing a vinyl polymer or vinylidene polymer, more particularly a process for rapidly polymerizing a monomer having a vinyl or vinylidene group by using specific polymerization initiator and promoter.

PRIOR ART

It is known that a rapid polymerization of a monomer having a vinyl or vinylidene group can proceed by using a redox type polymerization initiator.

For instance, it is disclosed in U.S. Pat. No. 4,717,756 that a mixture of monofunctional and polyfunctional unsaturated monomers is polymerized in the presence of (i) a radical polymerization initiator, (ii) a reducing substance containing sulfur in the molecule, (iii) an amine hydrohalide or a quaternary ammonium halide, and (iv) a copper-containing compound. It is also disclosed in Japanese Patent Second Publication (Kokoku) No. 7463/1977 that a process for polymerizing a monomer containing a vinyl or vinylidene group is carried out by using an organic phosphorus compound such as 9,10-dihydro-9-oxa-10-phosphaphenathrene-10-oxide or a derivative thereof as a chain transfer agent for the radical polymerization. The polymer obtained by this process has relatively lower molecular weight and can be used as a modifier for paints or adhesive compound or plastics.

According to the process disclosed in the above U.S. Pat. No. 4,717,756, the polymerization reaction proceeds rapidly, but it tends to produce a polymer having a comparatively smaller molecular weight, and hence, in order to obtain a polymer having a certain degree of mechanical strength, it is required to polymerize a monofunctional monomer having a vinyl or vinylidene group together with a polyfunctional monomer. When a polyfunctional monomer is polymerized together, the resultant polymer is disadvantageously colored in some degree.

On the other hand, the process disclosed in Japanese Pat. Second Publication No. 7463/1977 is not suitable for rapid polymerization of the monomer, and moreover the obtained polymer does not have enough mechanical strength for moldings, because of relatively lower molecular weight.

SUMMARY DESCRIPTION OF THE INVENTION

Under the circumstances, the present inventors have intensively studied on an improved process for polymerizing such a monomer having a vinyl or vinylidene group which can be carried out rapidly and can give the desired polymer having an appropriately large molecular weight, and have found that the desired polymerization can be carried out by using a specific polymerization initiator and a specific polymerization promoter.

An object of the invention is to provide an improved process for rapidly polymerizing a monomer having a vinyl or vinylidene group. Another object of the invention is to provide a process for the rapid polymerization of the monomer which can give a vinyl or vinylidene polymer having a comparatively large molecular weight without disadvantageous coloring of the product. A further object of the invention is to improve the rapid polymerization of the monomer having a vinyl or vinylidene group by using a specific polymerization initiator and a specific polymerization promoter. These and other objects and advantages of the invention will be apparent to those skilled in the art from the following description.

DETAILED DESCRIPTION OF THE INVENTION

The process for producing a vinyl or vinylidene polymer of this invention comprises polymerizing a monomer having a vinyl or vinylidene group in the presence of (a) a radical polymerization initiator, (b) an organic phosphorus compound of the formula (I):

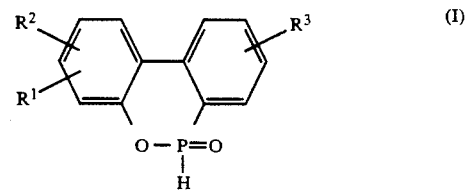

wherein $R^1$, $R^2$ and $R^3$ are independently a hydrogen atom, a chlorine atom, a bromine atom, an alkyl group having 1 to 8 carbon atoms (e.g. methyl, ethyl, propyl, butyl, t-butyl, etc.), an aralkyl group having 7 to 15 carbon atoms (e.g. benzyl, phenethyl, etc.), or an aryl group having 6 to 14 carbon atoms (e.g. phenyl, tolyl, xylyl, etc.), (c) an amine hydrohalide or a quaternary ammonium halide, and (d) a copper-containing compound.

The monomer having a vinyl or vinylidene group used in this invention comprises predominantly a monofunctional monomer having one vinyl or vinylidene group in the molecule and may optionally contain a small amount of a polyfunctional monomer having two or more vinyl or vinylidene groups in the molecule.

The monofunctional monomer includes, for example, styrene, monochlorostyrene, monobromostyrene, α-methylstyrene, acrylonitrile, vinyl acetate, methyl methacrylate, ethyl acrylate, butyl methacrylate, hydroxyethyl methacrylate, glycidyl methacrylate, trichlorophenyl methacrylate, tribromophenyl methacrylate, monobromophenyl methacrylate, pentabromophenyl methacrylate, and the like.

The monofunctional monomer may be used alone for the polymerization, but preferably, it is used in the form of a syrup thereof which is prepared by dissolving a small amount of a polymer of said monomer(s) in the monofunctional monomer(s) in order to improve the polymerization activity and to make easier and simplify the handling of the monomer.

The polyfunctional monomer includes any conventional monomers, for example, an acrylic or methacrylic ester of a polyhydric alcohol such as mono- or poly-ethylene glycols, mono- or poly-propylene glycol, bisphenol A, etc., and divinylbenzene. The polyfunctional monomers are used by mixing into the above-mentioned monofunctional monomer or a syrup thereof.

The radical polymerization initiator used in this invention is preferably a peroxide, particularly preferably peracid esters and hydroperoxides in view of the high polymerization activity thereof.

The peracid esters include, for example, t-butyl peroxy-3,5,5-trimethylhexanoate, t-butyl peroxyacetate, t-butyl peroxybenzoate, and the like.

The hydroperoxides include t-butyl hydroperoxide, cumene hydroperoxide, diisopropylbenzene hydroperoxide, p-methane hydroperoxide, 2,5-dimethylhexane-2,5-dihydroperoxide, 1,1,3,3-tetramethylbutyl hydroperoxide, and the like.

The radical polymerization initiator is usually used in an amount of 0.001 to 5 parts by weight per 100 parts by weight of the monomer or syrup thereof. When the amount is less than 0.001 part by weight, the polymerization reaction proceeds insufficiently and a large amount of the starting monomer disadvantageously remains in the produced polymer. On the other hand, when the amount of the initiator is more than 5 parts by weight, it is difficult to control the polymerization reaction, and further the obtained polymer has disadvantageously inferior weatherability and inferior heat resistance.

The organic phosphorus compound of the formula (I) forms a redox with the radical polymerization initiator.

Among the organic phosphorus compounds of the formula (I), the preferred compound is a compound of the formula:

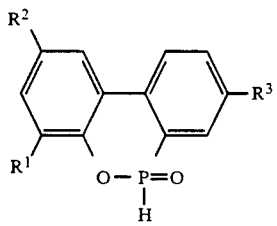

wherein $R^1$, $R^2$ and $R^3$ are the same as defined above.

Suitable examples of the organic phosphorus compound are 9,10-dihydro-9-oxa-10-phosphaphenanthrene-10-oxide, 6,8-di(t-butyl)-9,10-dihydro-9-oxa-10-phosphaphenanthrene-10-oxide, 6,8-dichloro-9,10-dihydro-9-oxa-10-phosphaphenanthrene-10-oxide, and the like.

The organic phosphorus compound is usually used in an amount of 0.001 to 5 parts by weight, preferably 0.1 to 3 parts by weight, per 100 parts by weight of the monomer or syrup thereof. When the amount is less than 0.001 part by weight, the polymerization reaction proceeds disadvantageously slowly, but on the other hand, when the amount is more than 5 parts by weight, the obtained polymer has disadvantageously lower molecular weight and lower mechanical strength.

The amine hydrohalide and quaternary ammonium halide used in this invention include, for example, hydrohalide salts (e.g. hydrochloride, or hydrobromide) of primary, secondary or tertiary amines of an alkyl group having 1 to 16 carbon atoms, an aryl group having 6 to 8 carbon atoms and/or an aralkyl group having 7 to 8 carbon atoms, such as n-amylamine, n-hexylamine, n-octylamine, n-decylamine, laurylamine, palmitylamine, dibutylamine, tributylamine, N,N-dimethyl-p-toluidine, phenethyldibutylamine, N,N,N',N'-tetramethylhexamethylenediamine, N,N,N',N'-tetramethyl-propylenediamine, N,N-diethylbenzylamine, N,N-dibutylbenzylamine, phenethyldiethylamine, and the like, and tetramethylammonium chloride, benzyltrimethylammonium chloride, benzyltrimethylammonium chloride, benzyltributylammonium chloride, trioctylmethylammonium chloride, and the like.

The amine hydrohalide or quaternary ammonium halide is usually used in an amount of 0.005 to 1 part by weight, preferably 0.01 to 0.5 part by weight, per 100 parts by weight of the monomer or syrup thereof. When the amount is less than 0.005 part by weight or more than 1 part by weight, the polymerization reaction proceeds disadvantageously slowly.

When the amine hydrohalide or quaternary ammonium halide is soluble in the monomer or syrup thereof, it is used as it stands, but when it is insoluble in the monomer or syrup thereof, it is used in a solution thereof in a solvent such as isopropanol, dimethyl phthalate, diethylene glycol, and the like.

The copper-containing compound used in this invention functions as a catalyst for decomposing the polymerization initiator and includes organic acid copper salts, copper-containing complexes, etc. which are soluble in the monomer or syrup thereof, for example, copper naphthenate, copper acetylacetonate, and the like.

The copper-containing compound is usually used in an amount (in Cu conversion) of 0.005 to 10 ppm, preferably 0.1 to 5 ppm, based on the amount of the monomer or syrup thereof. When the amount is less than 0.005 ppm, the polymerization reaction proceeds disadvantageously slowly, and when the amount is more than 10 ppm, the polymerization reaction proceeds disadvantageously slowly, too.

The polymerization of this invention can be carried out by a conventional method, such as suspension polymerization, solution polymerization, bulk polymerization, and the like. Among them, bulk polymerization within a mold is preferable.

In one embodiment, the above components such as the polyfunctional monomer, radical polymerization initiator, organic phosphorus compound of the formula (I), amine hydrohalide or quaternary ammonium halide, and copper-containing compound are dissolved in the monofunctional monomer or syrup thereof, and the thus-prepared liquid composition is poured within the mold and subjected to a polymerization reaction to give a formed polymer product.

When the above polymerization is carried out within the mold, the components such as polymerization initiator, etc. may be added in sequence to the monomer or syrup thereof and then the mixture may be subjected to the polymerization reaction. In this case, however, the polymerization reaction proceeds in the course of the mixing, and hence, the mixing is preferably done as rapidly as possible.

Accordingly, in a preferred embodiment, for instance, the monomer or syrup thereof is divided into two parts, and to one part are added the polymerization initiator and amine hydrohalide or quaternary ammonium halide, and to another part are added the organic phosphorus compound of the formula (I) and the copper-containing compound, and both liquid mixtures are mixed immediately before the polymerization reaction.

The mixing of the components is preferably carried out at a temperature of lower than 50° C. within about 10 minutes. When the temperature for mixing is higher than 50° C., the polymerization reaction proceeds disadvantageously during the mixing step. Besides, when the mixing period of time is longer than 10 minutes, the polymerization reaction proceeds disadvantageously during the mixing step, too.

Thus, as far as the mixing is completed, the mixing is preferably done in a period of time as short as possible.

When a small formed product is desired, the mixing may be carried out in a batch system, and the mixture is poured within the mold. When a formed product having a large size is desired, the starting components are preferably poured within the mold while continuously mixing. In any mixing method, the liquid mixture obtained by the mixing of the components is preferably poured within the mold as early as possible after mixing.

The continuous mixing is carried out by a conventional method for mixing liquids with a collision mixer, dynamic mixer, static mixer, etc.

The polymerization temperature is in the range at which the polymerization activity becomes highest as usual, which varies depending on the kinds of the radical polymerization initiator. Thus, it can be done even at room temperature, but preferably at 50° to 90° C.

EFFECTS OF THE INVENTION

According to the process of this invention, the polymerization reaction can proceed rapidly and stably and thereby there is obtained a polymer having excellent mechanical strength with less coloring, which is useful for the production of optical parts because the polymer thus prepared has far less internal strain. Such optical parts include conventional lenses, Fresnel's lens, optical recording media, prisms, mirrors, and the like. In this process, the face of the mold can precisely be transferred to the shaped products, and hence, it is particularly suitable for the production of optical recording media such as optical dish or optical card.

Moreover, this process can easily give large scale shaped products, and hence, is suitable for the production of automobile parts such as front windows, sun roofs, side windows, rear windows, etc., and further signs, water tank panels, bathtubs, and the like.

EXAMPLES

This invention is illustrated by the following Examples but should not be construed to be limited thereto.

Examples 1 to 3 and Reference Examples 1 to 3

Preparation of syrups:

In methyl methacrylate (94 parts by weight) was dissolved polymethyl methacrylate (molecular weight 1,000,000, 6 parts by weight) with heating at 60° C. to give a syrup stock which was a homogeneous solution having a viscosity of 2 poise (at 25° C.).

Polymerization:

To the syrup stock (100 parts by weight) were added t-butyl peroxybenzoate (as a radical polymerization initiator, 0.6 part by weight), a polymerization promoter as shown in Table 1, a 0.1 wt. % solution of copper naphthenate (copper content 10 %) in methyl methacrylate (as an auxiliary polymerization promoter, 0.6 part by weight), and dimethyloctylamine hydrochloride (0.06 part by weight), and the mixture was dissolved by mixing and then is poured into a cell (150 mm×150 mm) which was formed by two glass plates sealed with a polyvinyl chloride resin-made gasket (thickness 3 mm), and the cell was dipped in a bath of 85° C. to proceed with the polymerization of the mixture.

The polymerization period of time, i.e. the period of from initiation of heating till the exothermic heat due to the polymerization reaction became maximum was measured.

The properties of the polymer products obtained above were tested as follows.

The polymer product was cut in a length of 10 cm and abraded, and the coloring at the edge was observed with the naked eye.

Besides, the flexural strength of the product was tested in accordance with the method as described in ASTM D-790. The results are shown in Table 1.

TABLE 1

| Examples | Polymeriz. promoter Kind* | part by wt. | Polymerization time (min.) | Coloring at edge | Flexural strength (kg/cm$^2$) |
|---|---|---|---|---|---|
| Example 1 | HCA | 0.6 | 5 | Colorless | 1000 |
| Example 2 | HCA | 1.0 | 6 | Colorless | 800 |
| Example 3 | HCA | 0.3 | 7 | Colorless | 800 |
| Ref. Ex. 1 | — | — | Not polymerized | — | — |
| Ref. Ex. 2 | GDMA | 0.6 | 6 | Yellowing | 400 |
| Ref. Ex. 3 | DPP | 0.67 | Not polymerized | — | — |

*HCA: 9,10-Dihydro-9-oxa-10-phosphaphenanthrene-10-oxide
GDMA: Glycol dimercaptoacetate
DPP: Diphenylphosphine

EXAMPLES 4 TO 6

Preparation of syrups:

In the same syrup stock as prepared in Example 1 (50 parts by weight) were dissolved t-butyl peroxybenzoate (as a polymerization initiator, 0.6 part by weight) and dimethyloctylamine hydrochloride (as an auxiliary polymerization promoter, 0.06 part by weight) to give a syrup (referred to as "syrup A").

Separately, in the same syrup stock as prepared in Example 1 (50 parts by weight) were dissolved 9,10-dihydro-9-oxa-10-phosphaphenanthrene-10-oxide (0.6 part by weight) and a 0.1 wt. % solution of copper naphthenate (copper content 10%) in methyl methacrylate (0.6 part by weight) to give a syrup (referred to as "syrup B").

Polymerization:

The above syrup A and syrup B (in equal weight) were mixed at room temperature for several minutes, and the mixture was poured into a cell having the same size as in Example 1, which was dipped in a water bath at the temperature as shown in Table 2 to proceed with the polymerization reaction.

In the same manner as described in Example 1, the polymerization period of time was measured, and further the coloring at the edge of the products thus obtained was observed likewise. The results are shown in Table 2.

TABLE 2

|  | Example 4 | Example 5 | Example 6 |
|---|---|---|---|
| Bath temperature (°C.) | 40 | 60 | 80 |
| Polymerization time (minute) | 20 | 15 | 6 |
| Coloring at edge | Colorless | Colorless | Colorless |

EXAMPLES 7 AND 8

To the same syrup stock as prepared in Example 1 (90 parts by weight) were added the polyfunctional monomer as shown in Table 3 (10 parts by weight), t-butyl peroxy-benzoate (0.6 part by weight), 9,10-dihydro-9-oxa-10-phosphaphenanthrene-10-oxide (0.6 part by weight), a 0.1 wt. % solution of copper naphthenate (copper content 10%) in methyl methacrylate (0.6 part by weight) and dimethyloctyl-amine hydrochloride (0.06 part by weight), and the mixture was dissolved, and the mixture is poured into a cell in the same manner as described in Example 1, which is dipped in a water bath at 85° C. to proceed with the polymerization reaction likewise.

The polymerization time, coloring at edge and flexural strength of the products were measured in the same manner as in Example 1. The results are shown in Table 3.

TABLE 3

|  | Example 7 | Example 8 |
| --- | --- | --- |
| Polyfunctional monomer* | 4G | 1G |
| Polymerization time (min.) | 3 | 2.5 |
| Coloring at edge | Colorless | Colorless |
| Flexural strength (kg/cm$^2$) | 1100 | 1100 |

*4G: Tetraethylene glycol dimethacrylate
1G: Ethylene glycol dimethacrylate

REFERENCE EXAMPLE 4

In the same syrup stock as prepared in Example 1 (100 parts by weight) are dissolved 9,10-dihydro-9-oxa-10-phosphaphenanthrene-10-oxide (4 parts by weight) and 2,2,-azobisisobutyronitrile (1 part by weight), and the mixture was poured into a cell, and the mixture was tried to proceed with polymerization in the same manner as described in Example 1. The polymerization time was 13 minutes, and obtained polymer was very brittle.

What is claimed is:

1. A process for producing a vinyl or vinylidene polymer which comprises polymerizing a monomer having a vinyl or vinylidene group or a syrup thereof in the presence of
   (a) 0.001 to 5 parts by weight per 100 parts by weight of said monomer or syrup thereof of a radical polymerization initiator selected from the group consisting of peracid esters and hydroperoxides;
   (b) 0.001 to 5 parts by weight per 100 parts by weight of said monomer or syrup thereof of an organic phosphorus compound of the formula:

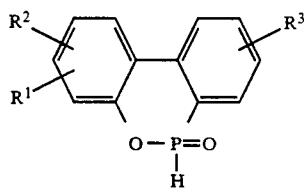

(I)

wherein $R^1$, $R^2$ and $R^3$ are independently a hydrogen atom, a chlorine atom, a bromine atom, an alkyl group, an aralkyl group or an aryl group;
   (c) 0.005 to 1 part by weight per 100 parts by weight of said monomer or syrup thereof of an amine hydrohalide or a quaternary ammonium halide; and
   (d) 0.005 to 10 ppm (in Cu conversion) based on the weight of said monomer or syrup thereof of an organic copper-containing compound which is soluble in said monomer or a syrup thereof.

2. The process according to claim 1, wherein the monomer having a vinyl or vinylidene group is in the form of a syrup.

3. The process according to claim 1, wherein the organic phosphorus compound (b) is a compound of the formula:

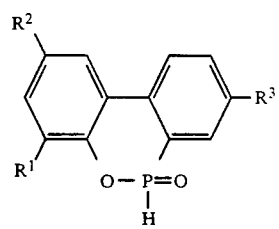

wherein $R^1$, $R^2$ and $R^3$ are the same as defined in claim 1.

4. The process according to claim 1, wherein the organic phosphorus compound (b) is a member selected from the group consisting of 9,10-dihydro-9-oxa-10-phosphaphenanthrene-10-oxide, 6,8-di(t-butyl)-9,10-dihydro-9-oxa-10-phosphaphenanthrene-10-oxide, and 6,8-dichloro-9,10-dihydro-9-oxa-10-phosphaphenanthrene-10-oxide.

5. The process according to claim 1, which is carried out by a bulk polymerization.

6. The process according to claim 1, which is carried out at a polymerization temperature of 50° to 90° C.

7. The process according to claim 1, wherein the amount of said organic phosphorus compound of formula (I) is 0.1 to 3 parts by weight per 100 parts by weight of said monomer or syrup thereof.

8. The process according to claim 1, wherein the amount of said amine hydrohalide or quaternary ammonium halide is 0.01 to 0.5 parts by weight per 100 parts by weight of said monomer or syrup thereof.

9. The process according to claim 1, wherein the amount of said organic copper-containing compound is 0.1 to 5 ppm based on the amount of said monomer or syrup thereof.

10. The process according to claim 1, wherein said monomer or syrup thereof and said components (a), (b), (c), and (d) are mixed at a temperature lower than 50° C. prior to the polymerization reaction.

11. The process according to claim 1, wherein said monomer or syrup thereof is selected from the group consisting of styrene, monochlorostyrene, monobromostyrene, α-methylstyrene, acrylonitrile, vinyl acetate, methyl methacrylate, ethyl acrylate, butyl methacrylate, hydroxyethyl methacrylate, glycidyl methacrylate, trichlorophenyl methacrylate, tribromophenyl methacrylate, monobromophenyl methacrylate, and pentabromophenyl methacrylate.

12. The process according to claim 1, wherein said radical polymerization inhibitor is selected from the group consisting of t-butyl peroxy-3,5,5-trimethylhexanoate, t-butyl peroxyacetate, t-butyl peroxybenzoate, t-butyl hydroperoxide, cumene hydroperoxide, diisopropylbenzene hydroperoxide, p-menthane hydroperoxide, 2,5-dimethylhexane-2, 5-dihydroperoxide, and 1,1,3,3-tetramethylbutyl hydroperoxide.

13. The process according to claim 1, wherein said organic phosphorus compound is selected from the group consisting of 9,10-dihydro-9-oxa-10-phosphaphenanthrene-10-oxide, 6,8-di(t-butyl)-9,10-dihydro-9oxa-10-phosphaphenanthrene-10-oxide, and 6,8-dichloro-9,10-dihydro-9oxa-10phosphaphenanthrene-10-oxide.

14. The process according to claim 1, wherein said amine hydrohalide is selected from the group consisting of hydrochloride and hydrobromide salts of n-amylamine, n-hexylamine, n-octylamine, n-decylamine, laurylamine, palmitylamine, dibutylamine, tributylamine, N,N-dimethyl-p-toluidine, phenethyldibutylamine, N,N,N',N'-tetramethylhexamethylenediamine, N,N,N',N'-tetramethylpropylenediamine, N,N-diethylbenzylamine, N,N-dibutylbenzylamine, phenethyldiethylamine, and said quaternary ammonium halide is selected from the group consisting of tetramethylammonium chloride, benzyltrimethylammonium chloride, benzyltriethylammonium chloride, benzyltributylammonium chloride, and trioctylmethylammonium chloride.

15. The process according to claim 1, wherein said organic copper-containing compound is selected from the group consisting of copper naphthenate and copper acetylacetonate.

16. A process for producing a vinyl or vinylidene polymer which comprises polymerizing a monomer having a vinyl or vinylidene group or a syrup thereof selected from the group consisting of styrene, monochlorostyrene, monobromostyrene, α-methylstyrene, acrylonitrile, vinyl acetate, methyl methacrylate, ethyl acrylate, butyl methacrylate, hydroxyethyl methacrylate, glycidyl methacrylate, trichlorophenyl methacrylate, tribromophenyl methacrylate, monobromophenyl methacrylate, and pentabromophenyl methacrylate in the presence of (a) 0.001 to 5 parts by weight per 100 parts by weight of said monomer or syrup thereof of a radical polymerization initiator selected from the group consisting of T-butyl peroxy-3,5,5-trimethylhexanoate, t-butyl peroxyacetate, t-butyl peroxybenzoate, t-butyl hydroperoxide, cumene hydroperoxide, diisopropylbenzene hydroperoxide, p-methane hydroperoxide, 2,5-dimethylhexane-2,5-dihydroperoxide, and 1,1,3,3-tetramethylbutyl hydroperoxide;

(b) 0.001 to 5 parts by weight per 100 parts by weight of said monomer or syrup thereof of an organic phosphorus compound selected from the group consisting of 9,10-dihydro-9-oxa-10-phosphaphenanthrene-10-oxide, 6,8-di(t-butyl)-9,10-dihydro-9oxa-10-phosphaphenanthrene-10-oxide, and 6,8-dichloro-9,10-dihydro-9-oxa-10-phosphaphenanthrene-10-oxide;

(c) 0.005 to 1 part by weight per 100 parts by weight of said monomer or syrup thereof of an amine hydrohalide selected from the group consisting of hydrochloride and hydrobromide salts of n-amylamine, n-hexylamine, n-octylamine, n-decylamine, laurylamine, palmitylamine, dibutylamine, tributylamine, N,N-dimethyl-p-toluidine, phenethyldibutylamine, N,N,N',N'-tetramethyl-hexamethylenediamine, N,N,N',N'-tetramethylpropylenediamine, N,N-diethylbenzylamine, N,N-dibutylbenzylamine, phenethyldiethylamine or a quaternary ammonium halide selected from the group consisting of tetramethylammonium chloride, benzyltrimethylammonium chloride, benzyltriethylammonium chloride, benzyltributylammonium chloride, and trioctylmethylammonium chloride; and (d) 0.005 to 10 ppm (in Cu conversion) based on the weight of said monomer or syrup thereof of an organic copper-containing compound which is soluble in said monomer or a syrup thereof, selected from the group consisting of copper naphthenate and copper acetylacetonate.

* * * * *